(12) United States Patent
Lewis, II et al.

(10) Patent No.: US 6,354,243 B1
(45) Date of Patent: Mar. 12, 2002

(54) ANIMAL LITTER CONTAINER

(75) Inventors: Ronald A. Lewis, II, St. Louis; Phillip Green, Jackson, both of MO (US)

(73) Assignee: Ralston Purina Company, St. Louis, MO (US)

( * ) Notice: Subject to any disclaimer, the term of this patent is extended or adjusted under 35 U.S.C. 154(b) by 0 days.

(21) Appl. No.: 09/465,896

(22) Filed: Dec. 17, 1999

Related U.S. Application Data

(60) Provisional application No. 60/112,784, filed on Dec. 18, 1998.

(51) Int. Cl.[7] ............................................. A01K 29/00
(52) U.S. Cl. ........................ 119/165; 119/161; 206/204
(58) Field of Search ................... 119/165, 161, 119/166, 168, 169; D30/161; 206/204

(56) References Cited

U.S. PATENT DOCUMENTS

| | | | |
|---|---|---|---|
| 2,469,784 A | * 5/1949 | Quinn | 119/165 |
| 5,195,464 A | * 3/1993 | Mutter | 119/165 |
| D370,317 S | * 5/1996 | Kohus | D30/161 |
| D376,875 S | * 12/1996 | Glickstein | D30/161 |
| D380,880 S | * 7/1997 | Reid | D30/161 |
| D388,560 S | * 12/1997 | Savicki | D30/161 |
| 5,791,289 A | * 8/1998 | Savicki | 119/165 |
| 5,816,195 A | * 10/1998 | Flynn | 119/165 |

* cited by examiner

*Primary Examiner*—Charles T. Jordan
*Assistant Examiner*—Judith A. Nelson
(74) *Attorney, Agent, or Firm*—Armstrong Teasdale LLP

(57) ABSTRACT

An animal litter container includes a bottom and a wall extending from the bottom. The wall includes a first portion and a second portion. An opening extends through the first portion and the first portion is shorter than the second portion. The first portion includes a ledge and the second portion includes a lip. The lip defines at least a portion of the opening and the ledge is wider than the lip. The bottom is textured to provide footing for the animal. A pair of slots extend through the ledge and a door extends across the opening and is attached to the wall utilizing the slots.

18 Claims, 6 Drawing Sheets

ANIMAL LITTER CONTAINER

CROSS REFERENCE TO RELATED APPLICATIONS

This application claims the benefit of U.S. Provisional Application No. 60/112,784, filed Dec. 18, 1998.

BACKGROUND OF THE INVENTION

This invention relates generally to containers for use with animals, and more particularly, to animal litter containers.

Animal litters of various compositions are commonly used for control and removal of animal waste. The most well-known litter compositions are sold by retailers for control of cat waste, and are widely used by cat owners. In contrast, dog owners typically do not use litter, but instead train a dog to use discarded newspapers, or to go outside. This usually involves an unpleasant task of removing waste by rolling up soiled newspapers, or scooping waste from the ground. Control of dog waste in such a manner is a particular annoyance for dog owners who travel frequently with their dogs. The availability of suitable outdoor space while traveling is often very limited, and indoor space, for example in hotels, is often restricted and does not include suitable places for spreading newspapers.

Dog owners have long sought an alternative to newspaper training or to taking a dog outside of a residence to urinate and defecate, especially in inclement weather. One alternative is for the dog to use a containment device including animal litter. However, typical litter containers are short and relatively small to allow cats to walk over a wall of the pan with ease. The relatively small size of the cat litter containers makes them impractical for use with dogs, both because of the size difference between dogs and cats and the different behaviors exhibited by dogs and cats.

Accordingly, it would be desirable to provide a litter container suitable for use by dogs. In addition, it would be desirable for the litter container to hold a sufficient amount of litter. Further, it would be desirable for the litter container to be transportable and easily set up during travel.

BRIEF SUMMARY OF THE INVENTION

In an exemplary embodiment of the invention, a litter container includes a bottom and a wall extending from the bottom. The wall includes a first portion including a ledge and a second portion including a lip. An opening extends through the first portion and the first portion is shorter than the second portion. The second portion lip defines at least a portion of the opening. The first portion ledge is wider than the second portion lip.

The litter container provides pet owners, especially dog owners, with a convenient litter box that is effective at catching and holding waste. In addition, puppies can be trained to use the litter container thus eliminating the need for paper training or the need for letting the dog outside during inclement weather.

DETAILED DESCRIPTION OF THE INVENTION

Figure 1:
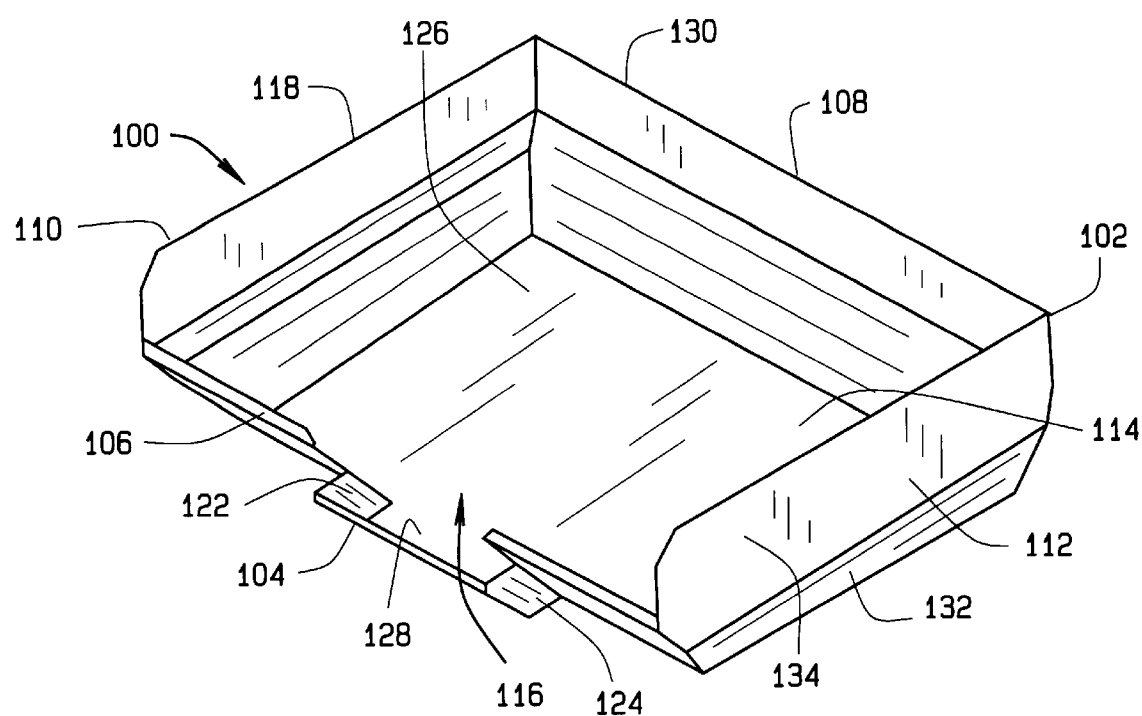
FIG. 1 is a perspective view of a litter container.
Figure 2:
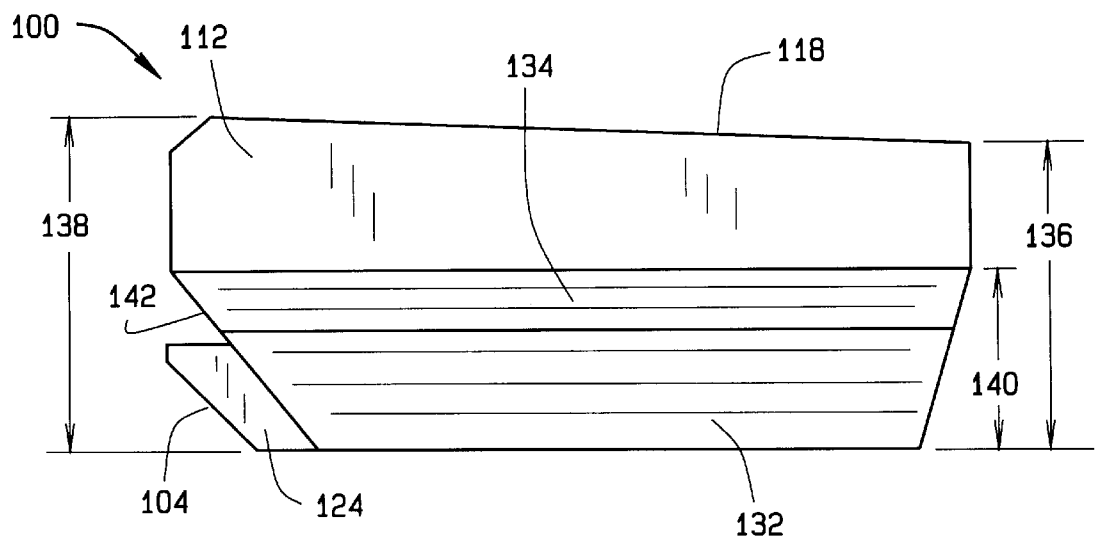
FIG. 2 is a side view of the litter container shown in FIG. 1.

FIGS. 1 and 2 are a perspective view and a side view, respectively, of a litter container 100 having a substantially rectangular shape and including a wall 102 having a flared portion 104 at a front 106 of container 100. Container 100 further includes a back 108, a first side 110, a second side 112, and a bottom 114. Wall 102 extends from bottom 114 and includes an opening 116 through a portion of front 106. Wall 102 also includes a second portion 118 connected to flared portion 104 by a first extension 122 and a second extension 124. Extensions 122 and 124 are substantially perpendicular to bottom 114 and to front 106. Flared portion 104 helps catch urine or excrement from a dog walking into or out of container 100. In addition, flared portion 104 is beneficial if a dog is straddling opening 116 of container 100.

Bottom 114 is relatively flat and includes a first portion 126 and a second portion 128. Wall 102 extends from bottom first portion 126 and extensions 122 and 124 and flared portion 104 extend from bottom second portion 128. In one embodiment, wall second portion 118 and flared portion 104 extend upwardly and outwardly from bottom 114 at an obtuse angle. For example, bottom 114 has a width of about 18 inches and a length of about 27¾ inches at back 108 of container 100. In comparison, litter container 100 has a width of about 24 inches and a length of about 30 at a top 130 of side wall 102. The obtuse angle of wall 102 helps keep urine inside container 100 and also provides the animal with more room inside container 100. In one embodiment, wall 102 includes a smooth anti-stick surface available from Peck Rock to reduce the adherence of urine to side wall 102.

Generally, back 108 has a height of about nine to about ten inches and sides 110 and 112 have a height of about ten to about eleven inches. Opening 116 has a width of about ten to about twelve inches and flared portion 104 has a height of about three to about four inches. In addition, front 106 has a height of about five to about six inches.

In one exemplary embodiment, wall first portion 118 includes a bottom portion 132 connected to bottom 114 and a top portion 134 extending from bottom portion 132. Bottom portion 132 is angled approximately 130° with respect to bottom 114 at front 106 and flared portion 104 is angled approximately 135° with respect to bottom 114. Bottom portion 132 at sides 110 and 112 is angled approximately 130° with respect to bottom 114 and approximately 106° with respect to bottom 114 at back 108.

Top portion 134 is angled with respect to bottom portion 132 such that top portion 134 is substantially perpendicular to bottom 114. Top portion 134 is angled approximately 16° with respect to bottom portion 132 at back 108 and approximately 40° with respect to bottom portion 132 at front 106. Along sides 110 and 112, the angle between bottom portion 132 and top portion 134 is a compound angle that transitions from about 74° at back 108 to about 50° at front 106. The average angle along sides 110 and 112 is about 64°.

Sides 110 and 112 have a height 136 at back 108 approximately nine inches and a height 138 at front 106 approximately 9 15/16 inches, and bottom portion 132 of side wall 102 has a height 140 approximately 5 1/4 inches along a length of sides 110 and 112. Back 108 has a height approximately nine inches and front 106 has a height approximately six inches.

Flared portion 104 is approximately three inches high with about the top one half of an inch substantially perpendicular to bottom 114. Extensions 122 and 124 are approximately two inches in length and flared portion 104 extends about two inches beyond wall first portion 118 at a top and a bottom of flared portion 104. Front 106 may additionally include a middle portion 142 between top portion 134 and bottom portion 132. Middle portion 142 is angled slightly with respect to bottom portion 132. For example, middle portion 142 may be angled about 1° to about 3° with respect to bottom portion 132.

Figure 3:
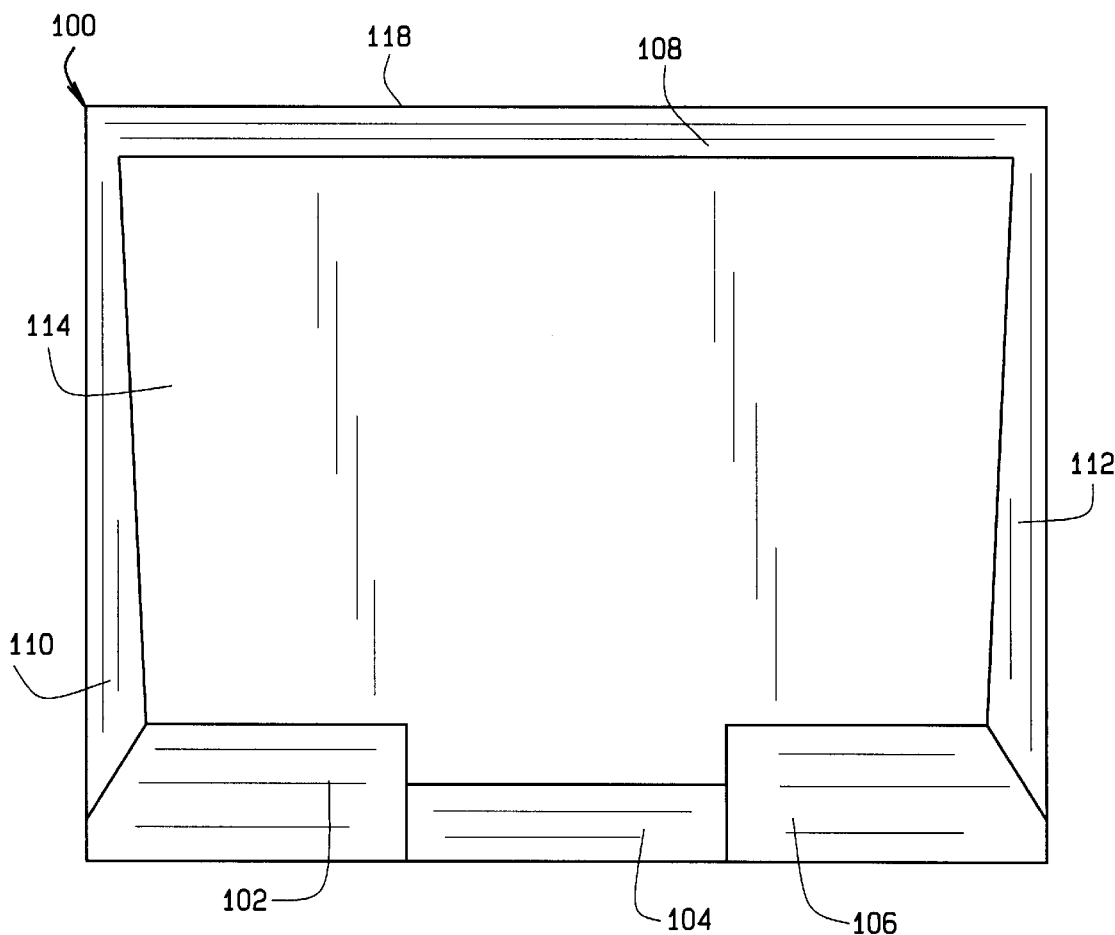
FIG. 3 is a top view of the litter container shown in FIG. 1.

FIG. 3 is a top view of litter container 100 illustrating the orientation of flared portion 104 with respect to wall first portion 118 at front 106. Flared portion 104 extends substantially the same distance from back 108 as does wall first portion 118 at front 106. Bottom 114 at back 108 is wider than at front 106 to provide the animal with additional room in which to turn around while inside container 100.

Figure 4:
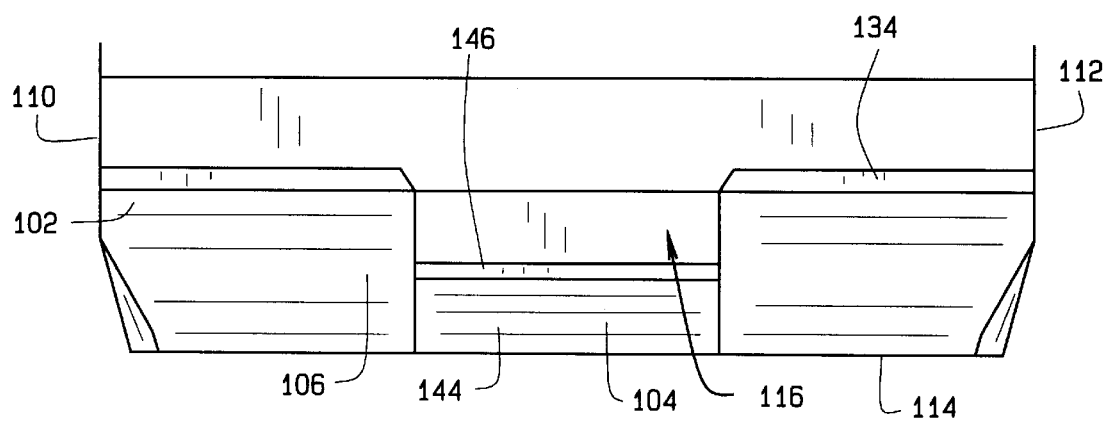
FIG. 4 is a front view of the litter container shown in FIG. 1.

FIG. 4 is a front view of container 100 illustrating opening 116 through front 106. Top portion 134 of wall 102 at front 106 has a height about 3/4 of an inch and is substantially perpendicular to bottom 114. In addition, flared portion 104 has a bottom portion 144 and a top portion 146. Bottom portion 144 is angled with respect to bottom 114. Top portion 146 is angled with respect to bottom portion 144 and is substantially perpendicular to bottom 114. In one embodiment, opening 116 is between about 10 inches and 12 inches wide. More specifically, opening 116 is about 10 inches wide.

Bottom 114 may include a plurality of dimples (not shown) that extend away from side wall 102. The dimples rest on a surface on which container 100 is placed. In one embodiment, bottom 114 includes five dimples. Additionally, bottom 114 can include a textured surface to provide the animals with better footing while inside container 100. Further, handles can be formed into wall 102 on sides 110 and 112 for use when moving container 100. The handles provide a place to grasp container 100 while container 100 is being moved.

Container 100 could also include an insert or a door (not shown) to close opening 116 while the animal is within container 100. The door could be slidably attached to front 106 on either an inside or an outside of container 100. Alternatively, the door could be placed within opening 116 while the pet is within container 100. The door would attach to front 106 and could be removed when the pet was finished using container 100. In addition, a pole could be attached to bottom 114 to provide a target for male dogs.

Of course there are many other variations of litter container 100 such as a side wall having only one portion. The portion may either be angled with respect to bottom 114 or substantially perpendicular to bottom 114. In addition, the container may not include a flared opening, but may instead include simply a cutout through front 106.

Figure 5:
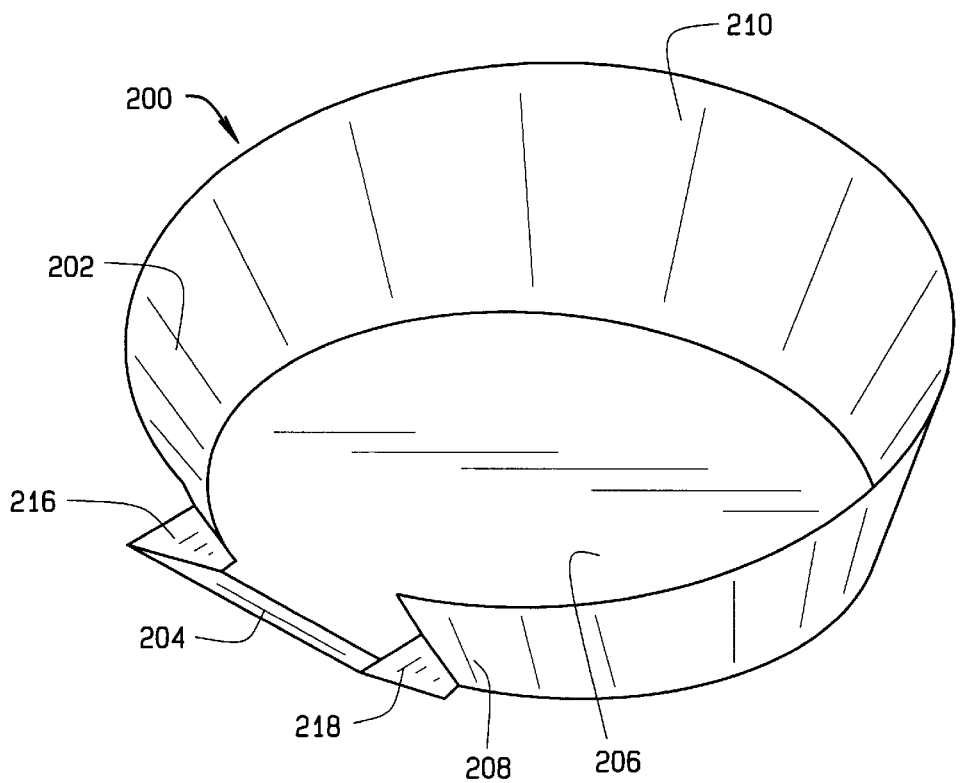
FIG. 5 is a perspective view of an alternative litter container.
Figure 6:
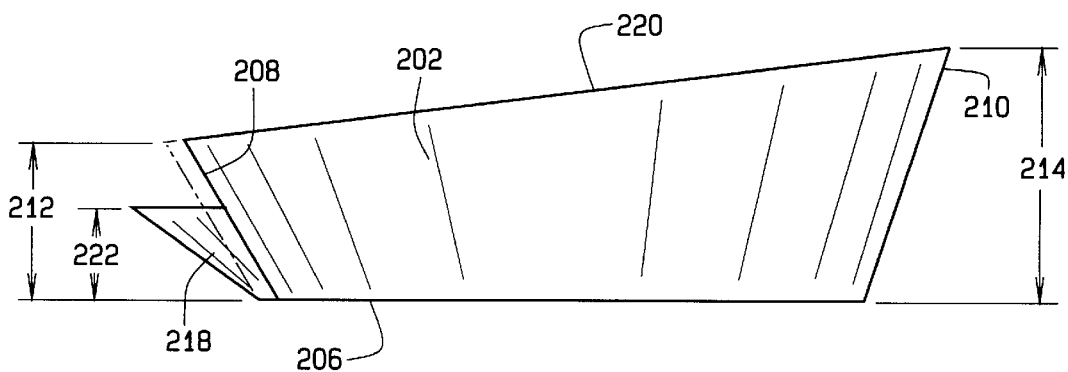
FIG. 6 is a side view of the litter container shown in FIG. 5.

FIGS. 5 and 6 are a perspective view and a side view, respectively, of an alternative litter container 200 having an oval shape and including a wall 202 having a flared portion 204. Wall 202 extends at an obtuse angle from a bottom 206 of container 200. In one embodiment, wall 202 is substantially straight from a top to a bottom of wall 202. Alternatively, wall 202 could include a bottom portion extending from bottom 206 and a top portion that extends from the top portion at an angle and that is substantially perpendicular to bottom 206.

In an exemplary embodiment, container 200 further includes a front 208 and a back 210. Wall 202 is shorter at front 208 than at back 210. For example, wall 202 has a height 212 at front 208 that is about five inches and a height 214 at back 210 that is about eight inches. In addition, wall 202 has an angle of about 60° at front 208 and an angle of about 70° at back 210.

Wall 202 also includes a first extension 216 and a second extension 218 that connect flared portion 204 to a first portion 220 of wall 202. Extensions 216 and 218 are substantially perpendicular to bottom 206. Flared portion 204 is shorter than wall first portion 220 at front 208, e.g., flared portion 204 has a height 222 of about three inches. Flared portion 204 extends about one inch from the remaining side wall 202 and is angled between about 30° and about 45°.

Figure 7:
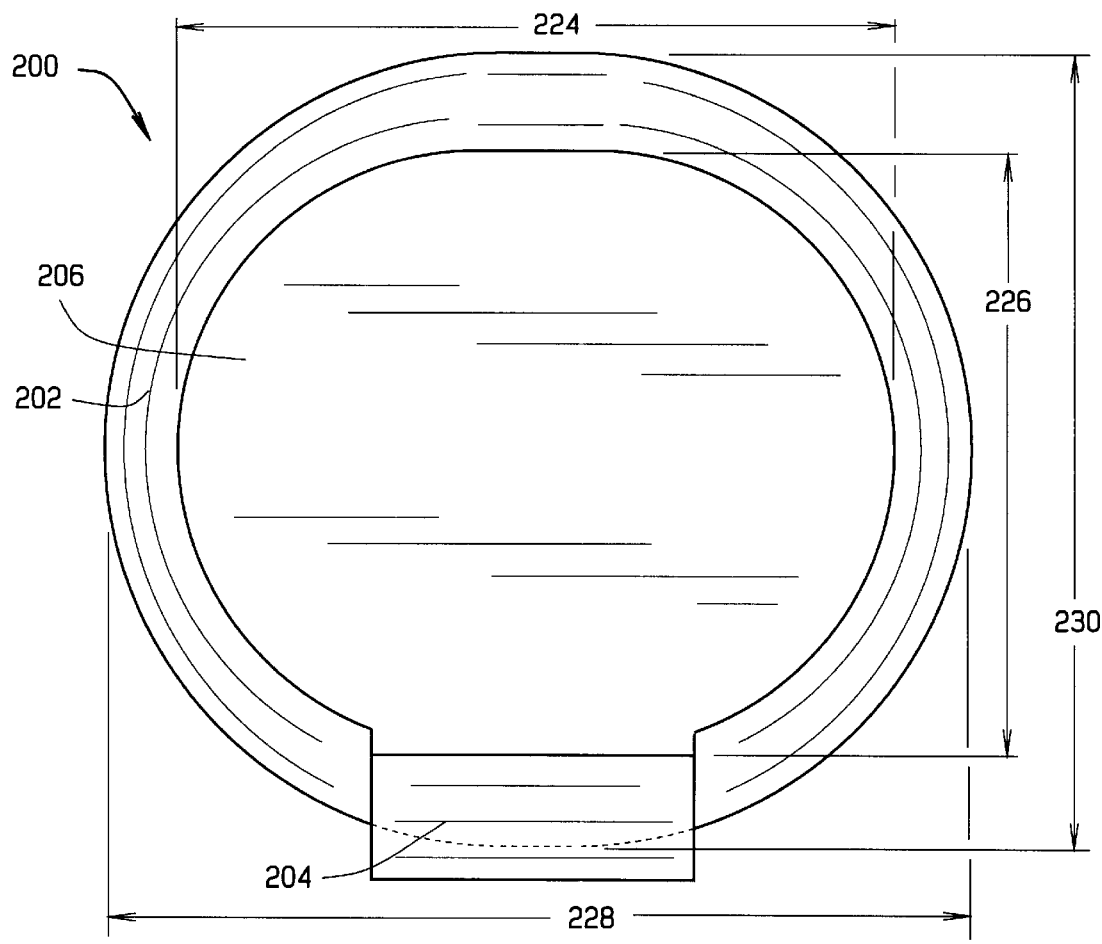
FIG. 7 is a top view of the litter container shown in FIG. 5.

FIG. 7 is a top view of litter container 200 illustrating flared portion 204 extending beyond wall first portion 220. Bottom 206 of container 200 has a length 224 of about 22 inches and a width 226 of about 19 inches. Bottom 206 is in the shape of an oval that is formed by two circles having centers separated by about three inches. Bottom 206 includes a portion that extends into an opening formed by flared portion 204. In one embodiment, flared portion 204 extends about 1 43/64 from the remaining portion of wall 202 at a top of wall 202. Container 200 has an outer length 228 of about 26 23/32 inches and an outer width 230 of about 24 3/16 inches.

The litter containers are fabricated by injection molding using a plastic such as a high density polyethylene (HDPE), available from Peck Rock Associates. In another embodiment, the containers can be fabricated from sheet metal. The sheet metal can include tabs that interconnect with an adjacent piece of sheet metal. Rivets, or some other fastener, can be used to fasten the pieces of sheet metal together. Alternatively, the litter container can be made from another non-porous material such as foam or a paper based material. In one embodiment, the container material is about 1/8 of an inch thick.

In a further embodiment, the bottom is fabricated to be detachably connected to the side wall. The detachable bottom provides for a convenient method of cleaning the container, for example, when the container is used outdoors. The bottom can then be reattached after the soiled litter has been removed.

Figure 8:
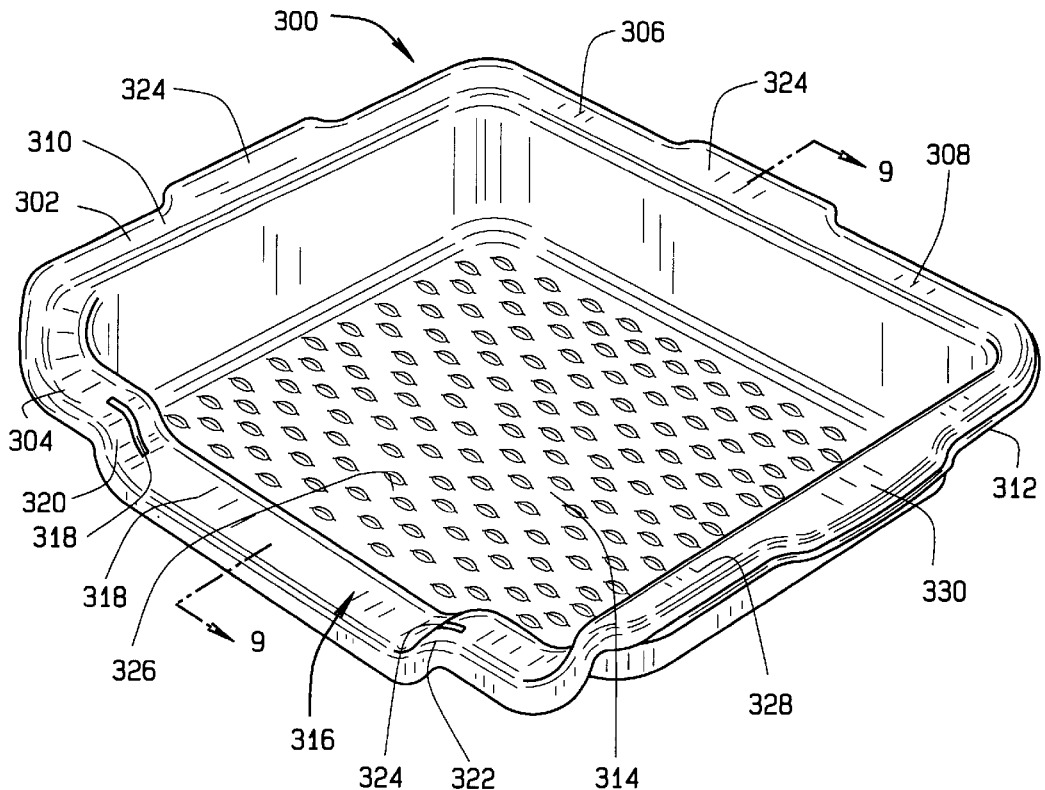
FIG. 8 is a perspective view of a further alternative embodiment of a litter container.

FIG. 8 is a further alternative embodiment of a litter container 300 having a substantially rectangular shape and including a wall 302 having a first portion 304 and a second portion 306. Container 300 further includes a back 308, a first side 310, a second side 312, and a bottom 314. Wall 302 extends from bottom 314 and includes an opening 316 through first portion 304. Opening 316 has a bottom 318, a first side 320, and a second side 322. Sides 320 and 322 are substantially perpendicular to opening bottom 318. First portion 304 is shorter than second portion 306 to allow a pet to walk into and out of container 300. First portion 304 includes a pair of slots 324. One of slots 324 is located on side 320 and one of slots 324 is located on side 322 of opening 316. Slots 324 are sized to receive a door (not shown in FIG. 8) which closes opening 316 as will be described in detail below.

Bottom 314 is relatively flat and includes a textured surface 326, such as a pebbled texture. Textured surface 326 extends up wall 302 a short distance. In one embodiment, textured surface 326 extends up wall 302 about one inch.

Wall second portion 306 includes a top lip 328 having a plurality of handles 330. In one embodiment, top lip 328 includes three handles 330, one on each of sides 310 and 312, and one on back 308. Wall first portion 304 includes a substantially flat ledge 332 that extends from first side 310 to second side 312. Ledge 332 defines opening 316 in first portion 304 and has a width greater than a width of lip 328. In one embodiment, slots 324 extend through ledge 332 from opening bottom 318 to atop portion 334 of first portion 304.

In one embodiment of container 300, first portion 304 has a height of about three inches, and sides 310 and 312 and back 308 have a height of about five inches. The height of first portion 304 along opening bottom 318 is about two and a half inches. In addition, container 300 has a length of about 20 inches and a width of about 24 inches.

In an alternative embodiment, first portion 304 has a height of about six inches, and sides 310 and 312 and back 308 have a height of about nine inches. The height of first portion 304 along opening bottom 318 is about two and a half inches. In addition, container 300 has a length of about 22 inches and a width of about 28 inches.

In a still further alternative embodiment, first portion 304 has a height of about three inches, and sides 310 and 312 and back 308 have a height of about five inches. The height of first portion 304 along opening bottom 318 is about two and a half inches. In addition, container 300 has a length of about 20 inches and a width of about 16 inches.

In use, litter is spread over bottom 314 so that it just covers textured surface 326. Textured surface 326 provides footing for the animal and gives the feeling of being outside on pebbled ground.

Figure 9:
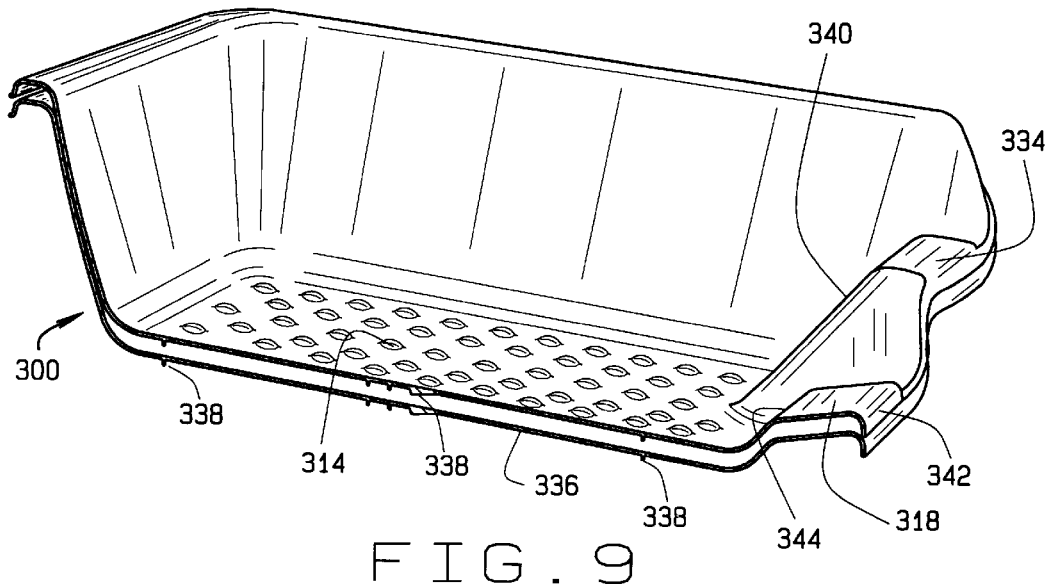
FIG. 9 is a cross sectional view of the litter container shown in FIG. 8 along line 9.

FIG. 9 is cross sectional view of container 300 taken along line 9 illustrating the stackability of containers 300. Bottom 314 includes a bottom surface 336 including a plurality of ribs 338. Ribs 338 provide support to bottom 314 of container 300 when litter and/or an animal is within container 300.

First portion 304 of wall 302 includes an angled portion 340 that extends between bottom 314 and top portion 334. In addition, opening bottom 318 is sloped towards bottom 314 from an outer portion 342 to an inner portion 344.

Figure 10:
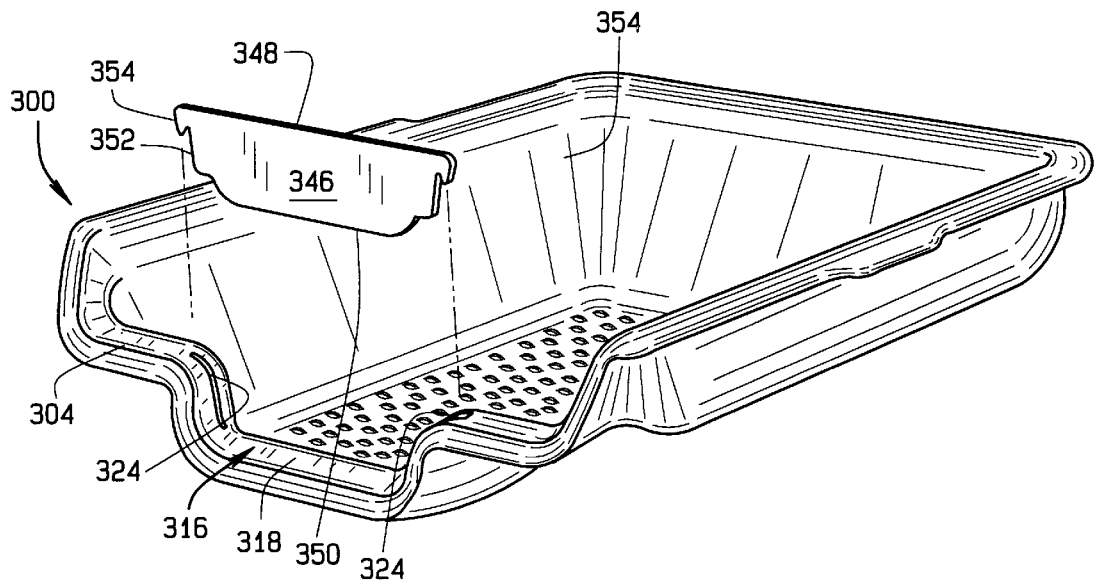
FIG. 10 is a perspective view of the litter container shown in FIG. 8 including a door.
Figure 11:
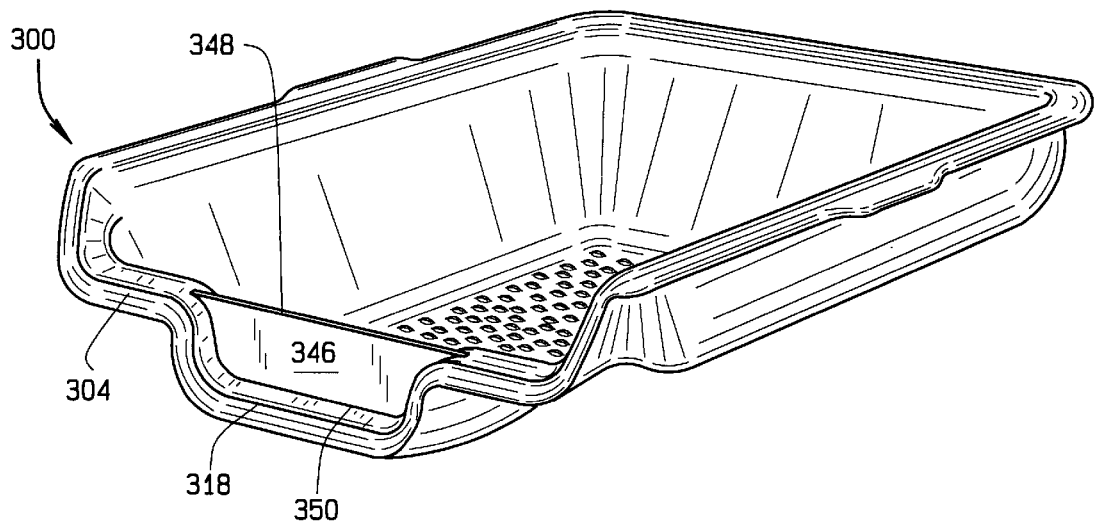
FIG. 11 is a perspective view of the litter container shown in FIG. 10 with the door positioned on the container.

FIGS. 10 and 11 illustrate container 300 including a door 346. Door 346 is sized to fit within slots 324 and to close opening 316. Referring to FIG. 10, door 346 includes a straight top edge 348 and a contoured bottom edge 350. Bottom edge 350 is shaped to closely match the contour of opening bottom 318. Door 346 further includes a first pair of tabs 352 that extend through slots 324 and prevent door bottom edge 350 from moving once door 346 is positioned in opening 316. Door 346 also includes a second pair of tabs 354 that interfit with a lip (not shown) in first portion 304 and prevent side-to-side movement, as well as front-to-back movement of top edge 348.

Referring to FIG. 11, top edge 348 is substantially co-linear with top portion 334 of first portion 304. Door 346 is utilized to train an animal to remain in container 300 while urinating and/or defecating. Initially, door 346 is removed from container 300 and an animal is allowed to enter container 300. Door 346 is then placed in opening 316 so that the animal can not easily exit container 300 the same way container 300 was entered. After the animal has either urinated or defecated, door 346 is removed and the animal is allowed to exit container.

In use, for example, a dog owner purchases litter and spreads a layer of the litter in the litter container. The litter container, for example, is made from a non-porous material such as plastic, metal, foam, or a paper based material. For dogs, the litter container, or pan, is about 6 inches high, and the size of the litter pan or box is chosen according to the size of the dog. For example, an oblong litter pan for a toy breed dog, weighing less than about 10 pounds, is about 20 inches long, and about 15 inches wide. Alternatively, for a miniature dog between about 10 pounds and about 20 pounds, the litter pan is about 24 inches by about 20 inches. In a further alternative embodiment, for a dog between about 20 pounds and about 35 pounds, the litter pan is about 28 inches by about 22 inches.

Removal of soiled litter is accomplished with a scoop, shovel or rake, or some combination thereof, similar to those commonly used in cleaning cat litter pans. The scoop, shovel or rake is modified in size and shape to accommodate the size and shape of the litter. Soiled litter may be disposed of in plastic litter disposal bags or paper bags with roll-type closures and an inner plastic liner.

The litter container provides a convenient and effective container for animal wastes. The angled walls help contain the waste when the animal stands within the container. In addition, the container has an opening so the dog has a defined entryway and does not mistake the litter container for a den area for sleeping.

While the invention has been described in terms of various specific embodiments, those skilled in the art will recognize that the invention can be practiced with modification within the spirit and scope of the claims.

What is claimed is:

1. A litter container comprising:
   a bottom;
   a wall extending from said bottom, said wall including a first portion, a second portion, and an opening extending through said first portion, said first portion shorter than said second portion, said first portion further including a ledge defining at least a portion of said opening; and
   a door positioned within said opening and configured to attach to said wall first portion.

2. A container in accordance with claim 1 wherein said opening is positioned at a center of said wall first portion ledge.

3. A container in accordance with claim 2 wherein said wall first portion extends at an obtuse angle with respect to said bottom.

4. A container in accordance with claim 1 wherein said wall second portion includes a lip, said first portion ledge has a first width and said second portion lip has a second width, said first width greater than said second width.

5. A container in accordance with claim 1 wherein said second portion lip comprises a plurality of handles.

6. A container in accordance with claim 1 wherein said bottom comprises a textured surface.

7. A container in accordance with claim 1 wherein said container comprises molded plastic.

8. A container in accordance with claim 1 wherein said container is substantially rectangular.

9. A containment pan for pets, said pan comprising:

a bottom;

a first extension and a second extension;

a wall extending from said bottom, said wall comprising a first portion and a second portion, said first portion displaced from said second portion and connected to said second portion by extensions, wherein said first portion is shorter than said second portion; and an insert configured to be positioned on said wall first portion, said insert substantially flush with said wall second portion.

10. A containment pan in accordance with claim 9 wherein said extensions are substantially perpendicular to said bottom.

11. A containment pan in accordance with claim 9 wherein said wall second portion comprises a bottom portion and a top portion, said top portion substantially perpendicular to said bottom, said bottom portion extending from said bottom and angled with respect to said top portion.

12. A containment pan in accordance with claim 9 wherein said pan is substantially oval shaped and said wall is angled between approximately 55° and approximately 75°.

13. A containment pan in accordance with claim 9 wherein said pan is substantially rectangular.

14. A containment pan in accordance with claim 13 further comprising a front, a back, a first side, and a second side, said sides extending from said front to said back, said first side and said second side are taller at said front than at said back and said front is shorter than said back.

15. A containment pan in accordance with claim 9 wherein said bottom comprises a textured surface.

16. A containment pan in accordance with claim 9 further comprising a plurality of openings extending through said wall and configured to be used for carrying said pan.

17. A containment pan in accordance with claim 9 wherein said pan is configured to be used as a litter box for dogs.

18. A containment pan in accordance with claim 9 wherein said bottom is configured to detach from said wall.

* * * * *